US009154244B2

(12) United States Patent
Feng et al.

(10) Patent No.: US 9,154,244 B2
(45) Date of Patent: Oct. 6, 2015

(54) SYSTEMS AND METHODS FOR CONTROLLING THE SECOND ORDER INTERCEPT POINT OF RECEIVERS

(71) Applicants: Yiping Feng, North Brunswick, NJ (US); Peter Kinget, Summit, NJ (US)

(72) Inventors: Yiping Feng, North Brunswick, NJ (US); Peter Kinget, Summit, NJ (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 14/473,370

(22) Filed: Aug. 29, 2014

(65) Prior Publication Data
US 2015/0056937 A1    Feb. 26, 2015

Related U.S. Application Data

(63) Continuation of application No. 12/892,888, filed on Sep. 28, 2010, now Pat. No. 8,849,227.

(60) Provisional application No. 61/246,500, filed on Sep. 28, 2009.

(51) Int. Cl.
*H04B 17/21*    (2015.01)
*H04B 17/00*    (2015.01)

(52) U.S. Cl.
CPC ........... *H04B 17/21* (2015.01); *H04B 17/0085* (2013.01)

(58) Field of Classification Search
CPC . H04B 17/0062; H04B 17/0085; H04B 17/21
USPC .................. 455/67.14, 226.1; 329/319, 351
See application file for complete search history.

(56) References Cited

U.S. PATENT DOCUMENTS

| 5,323,119 | A   |   | 6/1994 | Powell et al. |
|-----------|-----|---|--------|---------------|
| 5,543,795 | A   | * | 8/1996 | Fernald ........................ 341/163 |
| 5,749,051 | A   |   | 5/1998 | Dent |
| 5,778,310 | A   |   | 7/1998 | Tong et al. |
| 6,075,980 | A   |   | 6/2000 | Scheck |
| 6,088,581 | A   |   | 7/2000 | Bickley et al. |
| 6,195,539 | B1  |   | 2/2001 | Galal et al. |
| 6,356,217 | B1  | * | 3/2002 | Tilley et al. ................... 341/118 |

(Continued)

OTHER PUBLICATIONS

Abidi, A.A., "General Relations Between IP2, IP3, and Offsets in Differential Circuits and the Effects of Feedback", In IEEE Transactions on Microwave Theory and Techniques, vol. 51, No. 5, May 2003, pp. 1610-1612.

(Continued)

*Primary Examiner* — Gennadiy Tsvey
(74) *Attorney, Agent, or Firm* — Byrne Poh LLP

(57) ABSTRACT

In accordance with some embodiments, methods for controlling the second order intercept point in a receiver are provided, the methods comprising: generating an amplitude modulated test tone; causing the test tone to be received by a receiver; determining a characteristic of a second order intercept point of the receiver based on the received test tone; and based on the characteristic, adjusting a parameter of the receiver. In accordance with some embodiments, systems for controlling the second order intercept point in as receiver are provided, the systems comprising: a test tone generator that generates an amplitude modulated test tone; a receiver that receives the test tone; a correlator that determines a characteristic of a second order intercept point of the receiver based on the received test tone; and digital logic that, based on the characteristic, adjusts a parameter of the receiver.

19 Claims, 7 Drawing Sheets

(56) References Cited

U.S. PATENT DOCUMENTS

| | | | |
|---|---|---|---|
| 6,377,315 | B1 | 4/2002 | Carr et al. |
| 6,842,489 | B2 | 1/2005 | Masenten |
| 6,868,128 | B1 | 3/2005 | Lane |
| 6,941,121 | B2 | 9/2005 | Chen |
| 7,058,368 | B2 | 6/2006 | Nicholls et al. |
| 7,378,999 | B1* | 5/2008 | McGrath et al. ............. 341/120 |
| 7,894,788 | B2 | 2/2011 | Keehr et al. |
| 8,055,234 | B2 | 11/2011 | Mattisson et al. |
| 8,634,928 | B1* | 1/2014 | O'Driscoll et al. ............. 607/61 |
| 2005/0179505 | A1* | 8/2005 | Di Giandomenico et al. ............. 333/17.1 |
| 2006/0045219 | A1 | 3/2006 | Wang et al. |
| 2008/0057899 | A1* | 3/2008 | Montemayor et al. ........ 455/255 |
| 2008/0201396 | A1* | 8/2008 | Kudo ............. 708/300 |
| 2008/0219080 | A1* | 9/2008 | Geens et al. ............. 365/227 |
| 2009/0086864 | A1 | 4/2009 | Komninakis et al. |
| 2009/0186587 | A1* | 7/2009 | Sobchak et al. ............ 455/196.1 |
| 2010/0233984 | A1 | 9/2010 | Yang et al. |
| 2010/0233986 | A1 | 9/2010 | Yamaji et al. |
| 2010/0328120 | A1* | 12/2010 | Van Der Plas et al. ....... 341/110 |
| 2011/0065409 | A1 | 3/2011 | Kenington |

OTHER PUBLICATIONS

Ali-Ahmad, W.Y., "Effective IM2 Estimation for Two-Tone and WCDMA Modulated Blockers in Zero-IF", RF Design, Technical Report, Apr. 2004, p. 32-40.

Aparin, V., "A New Method of TX Leakage Cancelation in W/CDMA and GPS Receivers", In IEEE Proceedings of the Radio Frequency Integrated Circuits Symposium (RFIC '08), Digest of Technical Papers, Atlanta, GA, US, Jun. 15-17, 2008, pp. 87-90.

Ayazian, S. and Gharpurey, R., "Feedforward Interference Cancellation in Radio Receiver Front-Ends", In IEEE Transactions in Circuits Systems II, vol. 54, No. 10, Oct. 2007, pp. 902-906.

Bagheri, R., et al., "An 800 MHz to 5 GHz Software-Defined Radio Receiver in 90 nm CMOS", In IEEE International Solid-State Circuits Conference (ISSCC '06), Digest of Technical Papers, San Francisco, CA, US, Feb. 6-9, 2006, pp. 1932-1941.

Balankutty, A., et al., "A 0.6V 32.5mW Highly Integrated Receiver for 2.4 GHz ISM-Band Applications", In Proceedings of the IEEE International Solid-State Circuits Conference (ISSCC '08), San Francisco, CA, US, Feb. 3-7, 2008, pp. 366-367, 620.

Balankutty, A., et al., "A 0.6-V Zero-IF/Low-IF Receiver with Integrated Fractional-N Synthesizer for 2.4-GHz ISM-Band Applications", In IEEE Journal of Solid-State Circuits, vol. 45, No. 3, Mar. 2010, pp. 538-553.

Bautista, E.E., et al., "A High IIP2 Downconversion Mixer Using Dynamic Matching", In IEEE Journal of Solid-State Circuits, vol. 35, No. 12, Dec. 2000, pp. 1934-1941.

Blaakmeer, S.C., et al., "Wideband Balun-LNA with Simultaneous Output Balancing, Noise-Canceling and Distortion-Canceling", In IEEE Journal of Solid-State Circuits, vol. 43, No. 6, Jun. 2008, pp. 1341-1350.

Brandolini, M., et al., "A 750mV 15kHz 1/f Noise Corner 51dBm IIp2 Direct-Conversion Front-End for GSM in 90nm CMOS", In IEEE International Solid-State Circuits Conference (ISSCC '06), Digest of Technical Papers, San Francisco, CA, US, Feb. 6-9, 2006, pp. 470-471.

Brandolini, M., et al., "A 750mV Fully Integrated Direct Conversion Receiver Front-End for GSM in 90-nm CMOS", In IEEE Journal of Solid-State Circuits, vol. 42, No. 6, Jun. 2007, pp. 1310-1317.

Chehrazi, S., et al., "A 6.5 GHz Wideband CMOS Low Noise Amplifier for Multi-Band Use", In Proceedings of the IEEE 2005 Custom Integrated Circuits Conference, San Jose, CA, US, Sep. 18-21, 2005, pp. 801-804.

Chehrazi, S., et al., "Noise in Passive FET Mixers: A Simple Physical Model", In Proceedings of the 2004 IEEE Custom Integrated Circuits Conference, San Jose, CA, US, Oct. 3-6, 2004, pp. 375-378.

Chen, M., et al., "Active 2nd-Order Intermodulation Calibration for Direct-Conversion Receivers", In IEEE International Solid-State Circuits Conference (ISSCC '06), Digest of Technical Papers, San Francisco, CA, US, Feb. 6-9, 2006, pp. 1830-1839.

Chen, P.W., et al., "A 0.13 µm CMOS Quad-Band GSM/GPRS/EDGE RF Transceiver Using a Low-Noise Fractional-N Frequency Synthesizer and Direct-Conversion Architecture", In IEEE Journal of Solid-State Circuits, vol. 44, No. 5, May 2009, pp. 1454-1463.

Crols, J. and Steyaert, M.S.J., "A Single-Chip 900MHz CMOS Receiver Front-End With a High Performance Low-IF Topology", In IEEE Journal of Solid-State Circuits, vol. 30, No. 12, Dec. 1995, pp. 1483-1492.

Crols, J. and Steyaert, M.S.J., "Low-IF Topologies for High Performance Analog Front Ends of Fully Integrated Receivers", In IEEE Transactions on Circuits and Systems II: Analog and Digital Signal Processing, vol. 45, No. 3, Mar. 1998, pp. 269-282.

Darabi, H. and Abidi, A.A., "Noise in RF-CMOS Mixers: A Simple Physical Model", In IEEE Journal of Solid-State Circuits, vol. 35, No. 1, Jan. 2000, pp. 15-25.

Darabi, H. and Chiu, J., "A Noise Cancellation Technique in Active RF-CMOS Mixers", In IEEE Journal of Solid-State Circuits, vol. 40, No. 12, Dec. 2005, pp. 2628-2632.

Darabi, H., "A Blocker Filtering Technique for SAW-Less Wireless Receivers", In IEEE Journal of Solid-State Circuits, vol. 42, No. 12, Dec. 2007, pp. 2766-2773.

Darabi, H., et al., "An IP2 Improvement Technique for Zero-IF Down-Converters", In IEEE International Solid-State Circuits Conference (ISSCC '06), Digest of Technical Papers, San Francisco, CA, US, Feb. 6-9, 2006, pp. 1860-1869.

de Gyvez, J.P. and Tuinhout, H.P., "Threshold Voltage Mismatch and Intra-Die Leakage Current in Digital CMOS Circuits", In IEEE Journal of Solid-State Circuits, vol. 39, No. 1, Jan. 2004, pp. 157-168.

Dufrene, K., et al., "Digital Adaptive IIP2 Calibration Scheme for CMOS Downconversion Mixers", In IEEE Journal of Solid-State Circuits, vol. 43, No. 11, Nov. 2008, pp. 2434-2445.

Durene, K., "Analysis and Cancellation Methods of Second Order Intermodulation Distortion in RFIC Downconversion Mixers", Ph.D. Dissertation, University Erlangen-Nuremberg, Feb. 1999, pp. 1-187.

Elahi, I. and Muhammad, K., "IIP2 Calibration by Injecting DC Offset at the Mixer in a Wireless Receiver", In IEEE Transactions on Circuits and Systems II: Express Briefs, vol. 54, No. 12, Dec. 2007, pp. 1135-1139.

Elahi, I. and Muhammad, K., "On IIP2 Improvement by Injecting DC Offset at the Mixer in a Wireless Receiver", In Proceedings of the IEEE Custom Integrated Circuits Conference (CICC '07), San Jose, CA, US, Sep. 16-19, 2007, pp. 659-662.

Elahi, I., et al., "IIP2 and DC Offset in the Presence of Leakage at LO Frequency", In IEEE Transactions on Circuits and Systems II: Express Briefs, vol. 53, No. 8, Aug. 2006, pp. 647-651.

Feng, Y. et al., "Design of a high performance 2-GHz Direct-Conversion Front-End with a Single-Ended RF Input in 0.13 µm CMOS", In IEEE Journal Solid-State Circuits, vol. 44, No. 5, May 2009, pp. 1380-1390.

Feng, Y., et al., "A High Performance 2-GHz Direct-Conversion Front End with Single-Ended RF Input in 0.13 µm CMOS", In Proceedings of the IEEE Radio Frequency Integrated Circuits Symposium (RFIC '08), Digest of Technical Papers, Atlanta, GA, US, Jun. 15-17, 2008, pp. 339-342.

Gotz, E., et al., "A Quad-Band Low Power Single Chip Direct Conversion CMOS Transceiver with Modulation Loop for GSM", In Proceedings of European Solid-State Circuits Conference (ESSCIRC '03), Estoril, PT, Sep. 16-18, 2003, pp. 217-220.

Harada, M., et al., "2-GHz RF Front-End Circuits in CMOS/SIMOX Operating at an Extremely Low Voltage of 0.5V", In IEEE Journal of Solid-State Circuits, vol. 35, No. 12, Dec. 2000, pp. 2000-2004.

Hashemi, H. and Hajimiri, A., "Concurrent Multiband Low-Noise Amplifiers—Theory, Design, and Application", In IEEE Transactions on Microwave Theory and Techniques, vol. 50, No. 1, Jan. 2002, pp. 288-301.

Ho, Y.C., et al., "A GSM/GPRS Receiver Front-End with Discrete-Time Filters in a 90nm Digital CMOS", In Proceedings of the 2005 IEEE Dallas/CAS Workshop in Architecture, Circuits and Implementation of SOCs (DCAS '05), Dallas, TX, US, Oct. 10, 2005, pp. 199-202.

(56) References Cited

OTHER PUBLICATIONS

Hotti, M., et al., "A Direct Conversion RF Front-End for 2-GHz WCDMA and 5.8GHz WLAN Applications", In Proceedings of the 2003 IEEE Radio Frequency Integrated Circuits Symposium (RFIC '03), Digest of Technical Papers, Philadelphia, PA, US, Jun. 8-10, 2003, pp. 45-48.

Hotti, M., et al., "IIP2 Calibration Methods for Current Output Mixer in Direct-Conversion Receivers", In Proceedings of the IEEE International Symposium on Circuits and Systems (ISCAS '05), vol. 5, Kobe, JP, May 23-26, 2005, pp. 5059-5062.

Hotti, M., et al., "RC-Load Analysis of the Downconversion Mixer IIP2", In Proceedings of the 2005 European Conference on Circuit Theory and Design, vol. 2, Cork, IE, Aug. 28-Sep. 2, 2005, pp. 237-240.

Hsu, C.M., et al., "A Low-Noise, Wide-BW 3.6GHz Digital Fractional-N Frequency Synthesizer with a Noise-Shaping Time-to-Digital Converter and Quantization Noise Cancellation", In Proceedings of the IEEE International Solid-State Circuits Conference, San Francisco, CA, US, Feb. 3-7, 2008, pp. 1-11.

Hwang, M.W., et al., "A High IIP2 Direct-Conversion Mixer Using an Even-Harmonic Reduction Technique for Cellular CDMA/PCS/GPS Applications", In Proceedings of the 2004 IEEE Radio Frequency Integrated Circuits (RFIC '08), Digest of Technical Papers, San Francisco, CA, US, Jun. 6-8, 2008, pp. 87-90.

International Technology Roadmap for Semiconductors, "Process Integration, Devices, and Structures", Technical Report, 2007, pp. 1-63, available at: http://www.itrs.net/Links/2007ITRS/2007_Chapters/2007_PIDS.pdf.

Jensen, O.K., et al., "RF Receiver Requirements for 3G W-CCDMA Mobile Equipment", In Microwave Journal, Feb. 1, 2000, pp. 22-46.

Kaczman, D., et al., "A Single-Chip 10-Band WCDMA/HSDPA 4-Band GSM/EDGE SAW-less CMOS Receiver With DigRF 3G Interface and +90 dBm IIP2", In IEEE Journal of Solid-State Circuits, vol. 44, No. 3, Mar. 2009, pp. 718-739.

Khatri, H., et al., "Distortion in Current Commutating Passive CMOS Downconversion Mixers", In IEEE Transactions on Microwave Theory and Techniques, vol. 57, No. 11, Nov. 2009, pp. 2671-2681.

Kim, N., et al., "A Highly Linear SAW-less CMOS Receiver Using a Mixer with Embedded TX Filtering for CDMA", In IEEE Journal of Solid-State Circuits, vol. 44, No. 8, Aug. 2009, pp. 2126-2137.

Kim, W., et al., "A Direct Conversion Receiver with an IP2 Calibrator for CDMA/PCS/GPS/AMPS Application", In IEEE Journal of Solid-State Circuits, vol. 41, No. 7, Jul. 2006, pp. 1535-1541.

Kivekas, K., et al., "Calibration Techniques of Active BiCMOS Mixers", In IEEE Journal of Solid-State Circuits, vol. 37, No. 6, Jun. 2002, pp. 766-769.

Laursen, S., "Second-Order Distortion in CMOS Direct Conversion Receiver for GSM", In Proceedings of the 25th European Solid-State Circuits Conference (ESSCIRC '99), Duisburg, DE, Sep. 21-23, 1999, pp. 342-345.

Lee, S.T. and Peng, S., "A GSM Receiver Front-End in 65nm Digital CMOS Process", In Proceedings of IEEE Custom Integrated Circuits Conference (CICC '05), San Jose, CA, US, Sep. 21, 2005, pp. 349-352.

Leroux, P., et al., "A 0.8-dB NF ESD-Protected 9-mW CMOS LNA Operating at 1.23 GHz", In IEEE Journal of Solid-State Circuits, vol. 37, No. 6, Jun. 2002, pp. 760-765.

Liu, C.W. and Damgaard, M., "IP2 and IP3 Nonlinearity Specification for 3G/WCDMA Receivers", In Microwave Journal, May 12, 2009, pp. 1-7.

Long, J.R., "Monolithic Transformers for Silicon RF IC Design", In IEEE Journal of Solid-State Circuits, vol. 35, No. 9, Sep. 2000, pp. 1368-1382.

Magoon, R., et al., "A Single-Chip Quad-Band (850/900/1800/1900 MHz) Direct Conversion GSM/GPRS RF Transceiver with Integrated VCOs and Fractional-N Synthesizer", In IEEE Journal Solid-State Circuits, vol. 37, No. 12, Dec. 2002, pp. 1710-1720.

Manstretta, D., et al., "Second-Order Intermodulation Mechanisms in CMOS Downconverters", In IEEE Journal of Solid-State Circuits, vol. 38, No. 3, Mar. 2003, pp. 394-406.

Mikkelsen, J., et al., "Feasibility Study of DC Offset Filtering for UTRA-FDD/WCDMA Direct-Conversion Receiver", In Proceedings of the 17th IEEE NORCHIP Conference, Oslo, NO, Nov. 1999, pp. 34-39.

Mirabbasi, S. and Martin, K., "Classical and Modern Receiver Architectures", In IEEE Communications Magazine, vol. 38, No. 11, Nov. 2000, pp. 132-139.

Muhammad, K., et al., "The First Fully Integrated Quad-Band GSM/GPRS Receiver in a 90-nm Digital CMOS Process", In IEEE Journal of Solid-State Circuits, vol. 41, No. 8, Aug. 2006, pp. 1772-1783.

Notice of Allowance dated May 23, 2014 in U.S. Appl. No. 12/892,888.

Office Action dated Jan. 6, 2014 in U.S. Appl. No. 12/892,888.

Office Action dated Jun. 11, 2013 in U.S. Appl. No. 12/892,888.

Office Action dated Nov. 28, 2012 in U.S. Appl. No. 12/892,888.

Office Action dated Dec. 19, 2012 in U.S. Appl. No. 12/941,777.

Orsatti, P., et al., "A 20mA-Receive 55mA-Transmit GSM Transceiver in 0.25μm CMOS", In IEEE Journal of Solid-State Circuits, vol. 34, No. 12, Dec. 1999, pp. 1869-1880.

Razavi, B., "A 2.4-GHz CMOS Receiver for IEEE 802.11 Wireless LAN's," IEEE Journal of Solid-State Circuits, vol. 34, No. 10, Oct. 1999, pp. 1382-1385.

Razavi, B., "Design Considerations for Direct-Conversion Receivers", In IEEE Transactions on Circuits and Systems II: Analog and Digital Signal Processing, vol. 44, No. 6, Jun. 1997, pp. 428-435.

Redman-White, W. and Leenaerts, D.M.W., "1/f Noise in Passive CMOS Mixers for Low and Zero IF Integrated Receivers", In Proceedings of the 27th European Solid-State Circuits Conference (ESSCIRC '01), Villach, AT, Sep. 18-20, 2001, pp. 41-44.

Rogin, J., et al., "A 1.5-V 45-mW Direct-Conversion WCDMA Receiver IC in 0.13-μm CMOS", In IEEE Journal of Solid-State Circuits, vol. 38, No. 12, Dec. 2003, pp. 2239-2248.

Rudell, J.C., et al., "A 1.9-GHz Wideband IF Double Conversion CMOS Receiver for Cordless Telephone Applications", In IEEE Journal of Solid-State Circuits, vol. 32, No. 12, Dec. 1997, pp. 2071-2088.

Ryynanen, J., et al., "A Dual-Band RF Front-End for WCDMA and GSM Applications", In IEEE Journal of Solid-State Circuits, vol. 36, No. 8, Aug. 2001, pp. 1198-1204.

Sacchi, E., et al., "A 15mW, 70kHz 1/f Corner Direct Conversion CMOS Receiver", In Proceedings of the IEEE 2003 Custom Integrated Circuits Conference, San Jose, CA, US, Sep. 21-24, 2003, pp. 459-462.

Safarian, A., et al., "Integrated Blocker Filtering RF Front Ends", In Proceedings of the 2007 IEEE Radio Frequency Integrated Circuits (RFIC '07), Digest of Technical Papers, Honolulu, HI, US, Jun. 3-5, 2007, pp. 13-16.

Sivonen, P. and Parssinen, A., "Analysis and Optimization of Packaged Inductively Degenerated Common-Source Low-Noise Amplifiers with ESD Protection", In IEEE Transactions on Microwave Theory and Techniques, vol. 53, No. 4, Apr. 2005, pp. 1304-1313.

Soer, M.C.M., et al., "A 0.2-to-2.0GHz 65nm CMOS Receiver Without LNA Achieving >11dBm IIP3 and <6.5 dB NF", In IEEE International Solid-State Circuits Conference (ISSCC '09), Digest of Technical Papers, San Francisco, CA, US, Feb. 8-12, 2009, pp. 222-223, 223a.

Springer, A., et al., "RF System Concepts for Highly Integrated RFICs for W-CDMA Mobile Radio Terminals", In IEEE Transactions on Microwave Theory and Techniques, vol. 50, No. 1, Jan. 2002, pp. 254-267.

Stanic, N. et al., "A 0.5V 900 MHz CMOS Receiver Front End", In 2006 Symposium on VLSI Circuits, Digest of Technical Papers, Honolulu, HI, US, Jun. 13-17, 2006, pp. 228-229.

Stanic, N., et al., "A 0.5V Receiver in 90 nm CMOS for 2.4 GHz Applications", In IEEE Radio Frequency Integrated Circuits Symposium (RFIC '07), Honolulu, HI, US, Jun. 3-5, 2007, pp. 109-112.

Stanic, N., et al., "A 2.4-GHz ISM-Band Sliding-IF Receiver With a 0.5-V Supply", In IEEE Journal of Solid-State Circuits, vol. 43, No. 5, May 2008, pp. 1138-1145.

Steyaert, M., et al., "A 2-V CMOS Cellular Transceiver Front-End", In IEEE Journal of Solid-State Circuits, vol. 35, No. 12, Dec. 2000, pp. 1895-1907.

(56) References Cited

OTHER PUBLICATIONS

Stroet, P.M., et al., "A Zero-IF Single-Chip Transceiver for Up to 22 Mb/s QPSK 802.11b Wireless LAN", In Proceedings of the 2001 IEEE International Solid-State Circuits Conference, Digest of Technical Papers, San Francisco, CA, US, Feb. 5-7, 2001, pp. 204-205, 447.

Tadjpour, S., et al., "A 900MHz Dual Conversion Low-IF GSM Receiver in 0.35µm CMOS", In IEEE International Solid-State Circuits Conference (ISSCC '01), Digest of Technical Papers, vol. 455, San Francisco, CA, US, Feb. 5-7, 2001, pp. 292-293, 455.

Terrovitis, M.T. and Meyer, R.G., "Intermodulation Distortion in Current-Commutating CMOS Mixers", In IEEE Journal of Solid-State Circuits, vol. 35, No. 10, Oct. 2000, pp. 1461-1473.

U.S. Appl. No. 12/941,777, filed Nov. 8, 2010.

U.S. Appl. No. 61/259,183, filed Nov. 8, 2009.

Valla, M., et al., "A 72-mW CMOS 802.11a Direct Conversion Front-End with 3.5-dB NF and 200-kHz 1/f Noise Corner", In IEEE Journal of Solid-State Circuits, vol. 40, No. 4, Apr. 2005, pp. 970-977.

Vidojkovic, V., et al., "A Low-Voltage Folded-Switching Mixer in 0.18µm CMOS", In IEEE Journal of Solid-State Circuits, vol. 40, No. 6, Jun. 2005, pp. 1259-1264.

Wu, S. and Razavi, B., "A 900-MHz/1.8-GHz CMOS Receiver for Dual-Band Applications", In IEEE Journal of Solid-State Circuits, vol. 33, No. 12, Dec. 1998, pp. 2178-2185.

Yamaji, T., et al., "An I/Q Active Balanced Harmonic Mixer with IM2 Cancelers and a 45/spl deg/Phase Shifter", In IEEE Journal of Solid-State Circuits, vol. 33, No. 12, Dec. 1998, pp. 2240-2246.

Yanduru, N.K., et al., "A WCDMA, GSM/GPRS/EDGE Receiver Front End Without Interstage SAW Filter", In Proceedings of the 2006 IEEE Radio Frequency Integrated Circuits Symposium, Digest of Technical Papers, San Francisco, CA, US, Jun. 11-13, 2006, pp. 77-80.

* cited by examiner

SYSTEMS AND METHODS FOR CONTROLLING THE SECOND ORDER INTERCEPT POINT OF RECEIVERS

CROSS REFERENCE TO RELATED APPLICATIONS

This application is a continuation of U.S. patent applicant Ser. No. 12/892,157, filed Sep. 28, 2010, which claims the benefit of U.S. Provisional Patent Application No. 61/246, 500, filed Sep. 28, 2009, each of which is hereby incorporated by reference herein in its entirety.

TECHNICAL FIELD

The disclosed subject matter relates to systems and methods for systems and methods for controlling the second order intercept point of receivers.

BACKGROUND

Having a high second order intercept point (IIP2) in a wireless communication receiver can be an important characteristic that determines how well the receiver performs in circumstances where there might be significant interference entering the receiver, e.g., transmit signal leakage.

For example, when operating in full duplex, as may be the case when operating under the Wideband Code Division Multiple Access (WCDMA) standard, a direct conversion receiver may need to have a very high second order intercept point (IIP2) due to transmit signal leakage. As another example, with a handset incorporating a low-IF Global System for Mobile Communications (GSM) receiver that can receive a GSM signal while also transmitting a Code Division Multiple Access (CDMA) signal, a high IIP2 may be needed to prevent the CDMA signal from be down-converted/demodulated into the low-IF GSM receiver. As yet another example, a high IIP2 may be needed when a CDMA transmitter is transmitting in close proximity to an active GSM receiver.

High IIP2 can be difficult to maintain in receivers (such as direct conversion receivers and low-IF receivers) because IIP2 can be very sensitive to manufacturing variations and operating conditions like supply voltage, local oscillator (LO) power and or frequency, and temperature.

SUMMARY

Systems and methods for trolling the second order intercept point of receivers are provided. In accordance with some embodiments, methods for controlling the second order intercept point in a receiver are provided, the methods comprising: generating an amplitude modulated test tone; causing the test tone to be received by a receiver; determining a characteristic of a second order intercept point of the receiver based on the received test tone; and based on the characteristic, adjusting a parameter of the receiver. In accordance with some embodiments, systems for controlling the second order intercept point, in a receiver are provided, the systems comprising: a test tone generator that generates an amplitude modulated test tone; a receiver that receives the test tone; a correlator that determines a characteristic of a second order intercept point, of the receiver based on the received test tone; and digital logic that, based on the characteristic, adjusts a parameter of the receiver.

DETAILED DESCRIPTION

Systems and methods for controlling the second order intercept point (IIP2) of receivers are provided. In accordance with some embodiments, systems for controlling the second order intercept point of direct conversion receivers can be implemented in a low-power, low-noise direct-conversion 1.8 GHz direct conversion receiver for Wideband Code Division Multiple Access (WCDMA) type applications. Such a receiver can include a self-calibration loop that maintains the IIP2 of the receiver, for example, to better than 60 dBm. In some embodiments, such a direct conversion receiver front end can have a conversion gain of 38.5 dB, a double side band (DSB) noise figure (NF) of 2.6 dB, and a third order intercept point (IIP3) of −17.6 dBm, can consume 15 mA from a 1.5 V supply, and can occupy 1.56 mm$^2$ in a 130 nm CMOS process.

Figure 7:
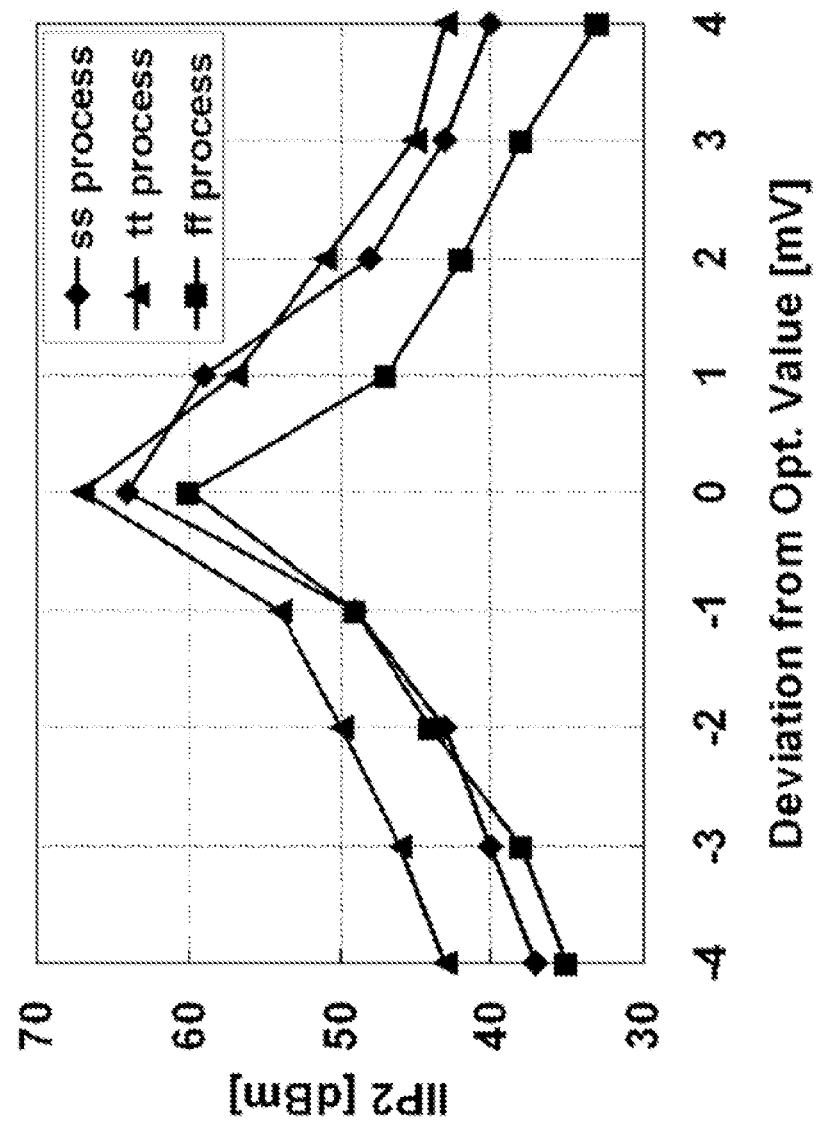
FIG. 7 is a graph showing a relationship between receiver IIP2 and a deviation from an optimal gate bias value that can be realized in accordance with some embodiments.

As shown in FIG. 7, the IIP2 of a receiver can be related to the deviation of a receiver mixer gate bias voltage from an optimal value. As illustrated, this relationship can be bell-shaped, such that as the receiver mixer gate bias voltage approaches the optimal value, the IIP2 value increases exponentially. A self-calibration loop can be used to adjust the receiver mixer gate bias voltage so that an optimal value (or a nearly optimal value) is set in accordance with some embodiments. More particularly, in some embodiments, to perform such calibration, a pseudo random noise (PN) modulated test tone can be generated and injected into a receiver. Second order non-linear ties in the receiver can then down-convert amplitude modulated (AM) information from the test-tone and the result can be correlated with the PN sequence used to modulate the test tone. This correlation can then reflect a measure of the second-order non-linearity of the receiver. That measure can then be used to adjust a receiver mixer gate bias voltage (or any other suitable parameter) in the receiver to improve the IIP2 of the receiver.

Figure 1:
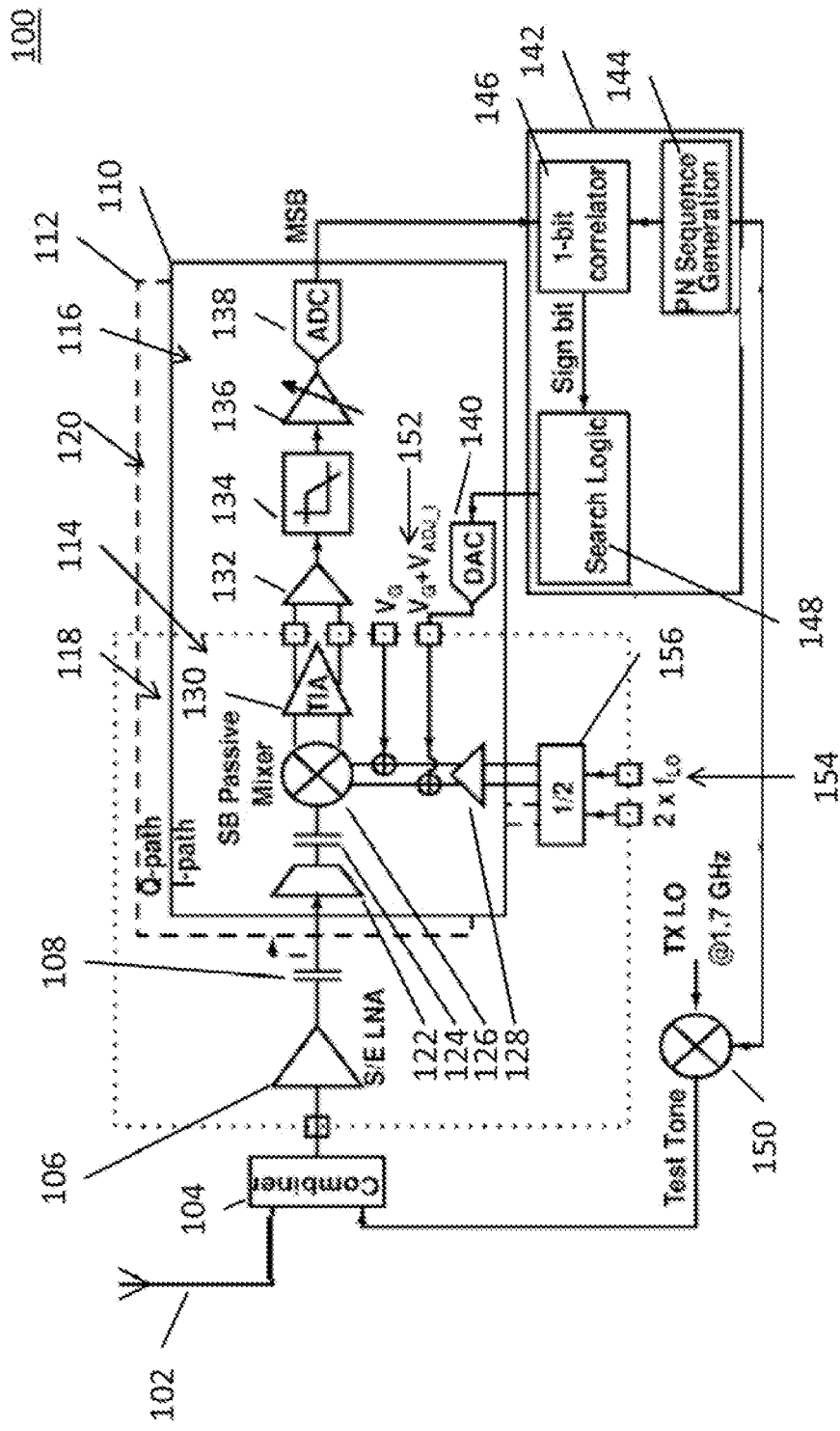
FIG. 1 is a schematic diagram of a direct conversion receiver including base-band stages and calibration control circuitry in accordance with some embodiments.

FIG. 1 illustrates an example of a receiver 100 with a self calibration mechanism in accordance with some embodiments. As shown, in receiver 100, an RF input source, such as an antenna 102, can be coupled through a combiner 104. Any suitable RF input source and combiner 104 can be used in some embodiments. The output of combiner 104 can be coupled to a single-ended low noise amplifier (LNA) 106, and the output of LNA 106 can then be coupled to an I-path 110 and a Q-path 112 via a capacitor 108. Examples of an LNA 106 and a capacitor 108 that can be used in some embodiments are provided below in connection with FIG. 2.

Within paths 110 and 112, there are a downconversion mixer 114 and a base-band stage 116 (in the I-path), and a downconversion mixer 118 and a base-band stage 120 (in the Q-path). As illustrated, the downconversion mixers can include a single-ended transconductor 122, a capacitor 124, a single balanced passive mixer 126, a local oscillator (LO) buffer 128, and a transimpedance amplifier 130. Examples of a transconductor 122, a capacitor 124, a single balanced passive mixer 126, an LO buffer 128, and a transimpedance amplifier 130 that can be used in some embodiments are provided below in connection with FIG. 2. As also illustrated, the base-band stages can include a buffer 132, a low pass filter 134, a variable gain amplifier 136, an analog-to-digital converter (ADC) 138, and a digital-to-analog converter (DAC) 140. Any suitable buffer 132, low pass filter 134, variable gain amplifier 136, ADC 138, and DAC 140 can be used in some embodiments.

After the analog to digital conversion in the base-band stage of the receiver, there is digital calibration control circuitry 142. Circuitry 142 can include a pseudo-random noise (PN) sequence generator 144, a 1-bit correlator 146, and search logic 148. Circuitry 142 provides feedback to the downconversion mixers via DACs 140 and provides a pseudo-random noise (PN) sequence to a mixer 150. Mixer 150 combines this PN sequence with a local oscillator signal to provide a test tone to combiner 104. Any suitable pseudo-random noise (PN) sequence generator 144, 1-bit correlator 146, search logic 148, mixer 150, and local oscillator signal can be used in some embodiments. While as combiner 104 is shown for injecting the test tone into the receiver, any suitable mechanism for injecting the test tone into the receiver can be used in some embodiments.

During calibration, the pseudo-random noise sequence is generated by calibration control circuitry 142. In some embodiments, the pseudo-random noise sequence can be a unipolar $2^8-1$ pseudo-random noise sequence with 1 μs bit length or any other suitable pseudo-random noise sequence. This sequence is mixed with the local oscillator signal (which can be set to 1.7 GHz or any other suitable value) by mixer 150 to form the test tone, which is provided to combiner 104. In some embodiments, this test tone can be a −30 dBm 1.7 GHz test tone that is On/Off Key (OOK) modulated or any other suitable test tone. The test tone is then received and amplified at LNA 106. The amplified test tone is then coupled by capacitor 108 to transconductance amplifier 122 and converted into a current signal, then coupled by capacitor 124 to passive mixer 126 and mixed with a local oscillator signal with a DC bias of $V_G+V_{ADJ}$ 152, and then converted to a voltage signal and amplified by transimpedance amplifier 130. Second order receiver non-linearities demodulate the amplitude modulated (AM) signal from the test tone and the PN sequence appears in the base-band.

The output of transimpedance amplifier 130 is next buffered by buffer 132, filtered by low pass filter 134, and amplified by variable vain amplifier 136. The resulting signal is then converted from analog form to digital form by ADC 138 and the most-significant bit is provided to calibration control circuitry 142. In some embodiments, the correlation operation in the present calibration can be implemented with 1-bit resolution by using the most-significant bit (MSB) of a multi-bit converter, such as a 6-bit analog-to-digital converter often used in Wideband Code Division Multiple Access (WCDMA) applications.

After analog-to-digital conversion, digital correlator 146 extracts the demodulated PN sequence to obtain information about the second order non-linearity of the receiver and produces a sign bit corresponding to the sign of the base-band PN sequence. For single-balanced mixers (such as mixer 126), the sign of the base-band PN sequence can be positive if $V_{ADJ}$ is too small, and negative if $V_{ADJ}$ too large (in some embodiment, the opposite can alternatively be true—i.e., the sign of the base-band PN sequence can be negative if $V_{ADJ}$ is too small, and positive if $V_{ADJ}$ is too large). The sign bit can then be used to control search logic 148, which drives DAC 140. DAC 140 then produces a gate bias voltage plus voltage adjustment setting that, along with a gate bias voltage, is combined with a local oscillator signal (produced from a double-local-oscillator-frequency signal 154 that is divided in half by a divide-by-two circuit 156 and provided to buffer 128) to adjust the gate bias of mixer 126. DAC 140 can be a 7-bit digital-to-analog converter with a 0.128 V output range, or any other suitable digital-to-analog converter, in some embodiments.

Although one bit is described herein as being used in the analog-to-digital converter and the digital correlator, more than one bit (such as six (or an suitable number of bits)) can be used in these components in some embodiments.

Figure 2:
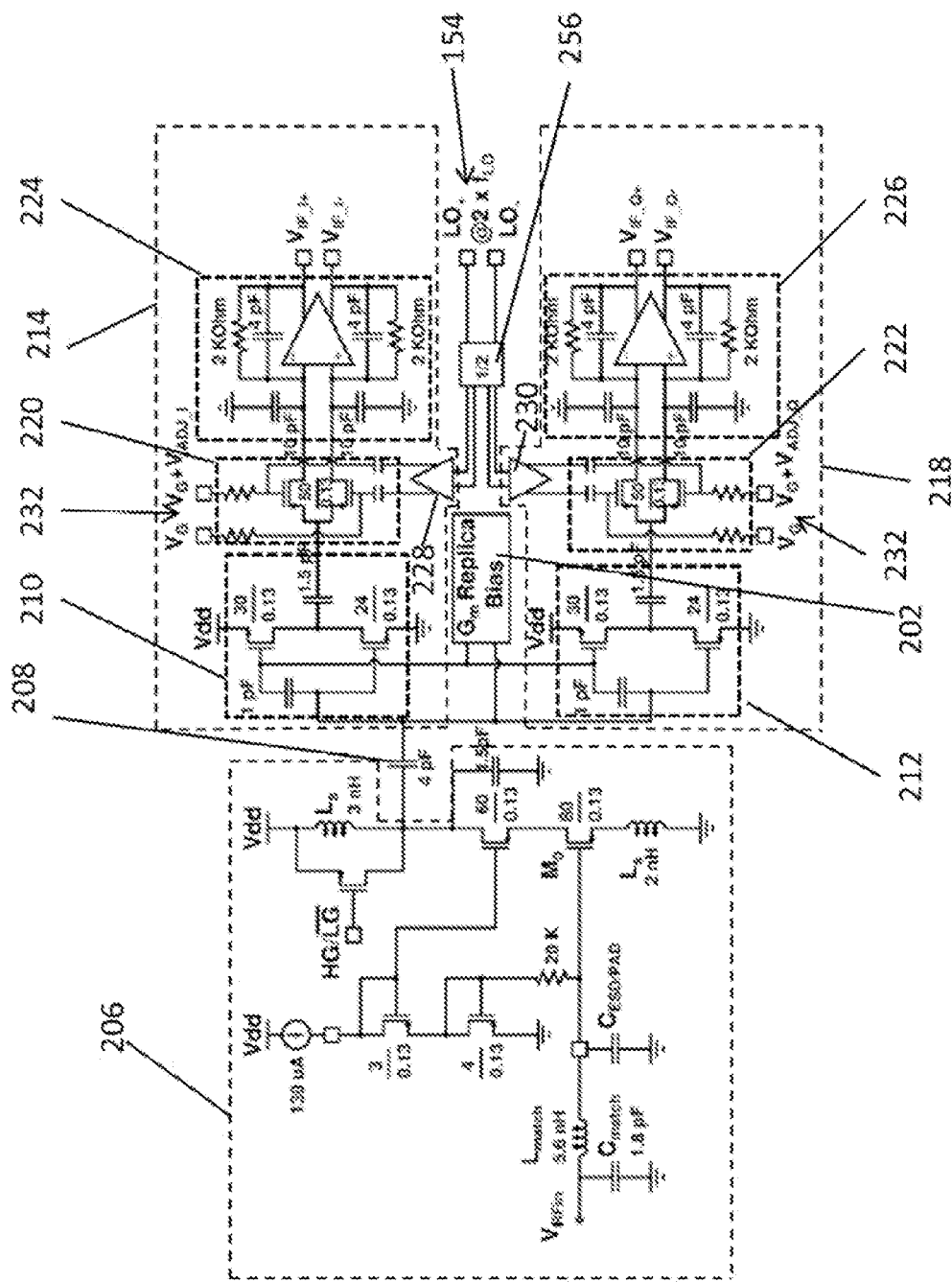
FIG. 2 is a schematic diagram of components that can be used to implement a low noise amplifier, a capacitor, and a down-conversion mixer in accordance with some embodiments.

FIG. 2 illustrates examples of circuitry 206, 208, 214, and 218 that can be used to implement LNA 106, capacitor 108, down-conversion mixer 114, and down-conversion mixer 118, respectively, in accordance with some embodiments. As can be seen, LNA circuitry 206 can be a single-ended, inductively degenerated, common-source low noise amplifier (LNA) with two gain mode settings (high gain (HG) and low gain (LG)). The output of the LNA circuitry can be AC-coupled to downconversion mixers 214 and 218 by a 4 pF (or any other suitable value) capacitor 208.

The downconversion mixers can include single-ended transconductors 210 and 212, current-driven, single-balanced, passive mixers 220 and 222, transimpedance amplifiers 224 and 226, and buffers 228 and 230. The single-ended transconductors can exploit current reuse to reduce consumption while maintaining noise and linearity performance, and can be controlled by a bias signal from a transconductance replica bias circuit 202 (which can be any suitable transconductance bias circuit). The current-driven single-balanced passive mixers can exhibit low 1/f noise and high linearity. The transimpedance amplifiers can provide a low input-impedance base-band load and use a two-stage operational transconductance amplifier (OTA) with feedback resistors and capacitors; and two input capacitors to ground can further be added to counter the input impedance increase due to the OTA bandwidth limitation. Quadrature local oscillator (LO) signals can be generated at the outputs of buffers 228 and 230 in cooperation with a differential SCL-type CMOS divide-by-2 circuit 256 from an external double frequency LO signal 154, or any appropriate LO generation circuit.

The second-order intermodulation products (IM2) from the LNA can be suppressed significantly with a capacitive coupling (208, 4 pF) to the transconductors: the residual IM2 products of the LNA and IM2 products of the transconductors driving the mixer switches can be further suppressed significantly with a high-pass capacitive coupling to the passive mixer. For example, such a coupling can be provided by the 1.5 pF capacitors (or any suitably sized capacitors) at the outputs of the transconductors.

A gate bias voltage plus voltage adjustment setting ($V_G + V_{ADJ}$ in FIG. 2) at terminals 232 can be used to adjust the second order intercept point (IIP2) of mixers 220 and 222. This is the case because: for passive current-driven mixers, the most prominent IM2 mechanisms are (a) local oscillator (LO) duty cycle distortion and mismatches in switches and load resistors of the mixers, (b) self-mixing, and (c) switch nonlinearity; LO duty cycle distortion and mismatches have the biggest impact on IM2; and LO duty cycle distortion and mismatches can be modeled with an equivalent offset at the switch gate of the mixers. See, e.g., D. Manstretta, M. Brandolini, and F. Svelto, "Second-order intermodulation mechanisms in CMOS downconverters," IEEE Journal of Solid-State Circuits, vol. 38, no. 3, pp. 394-406, March 2003, which is hereby incorporated by reference herein in its entirety.

Figure 3:
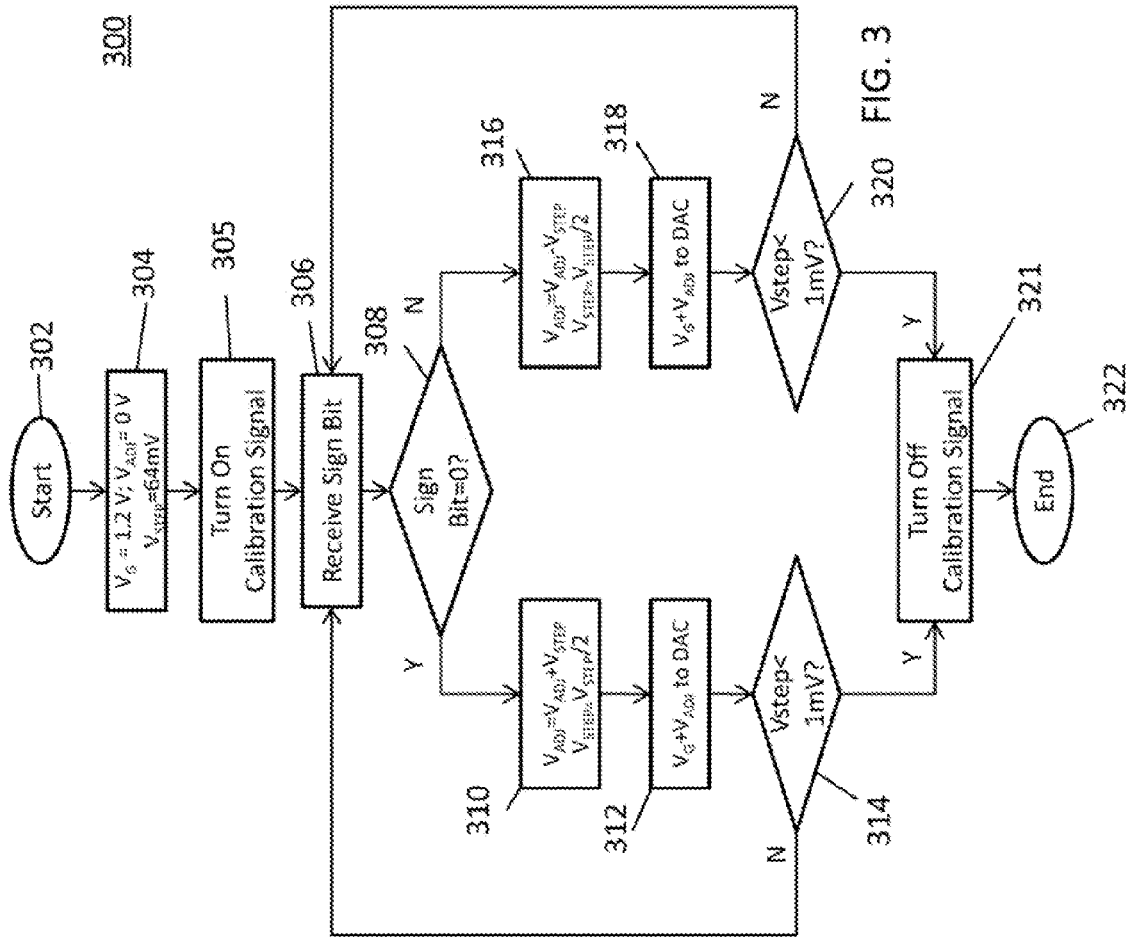
FIG. 3 is a diagram of a binary search process that can be used to control calibration settings of a down-conversion mixer in a direct conversion receiver in accordance with some embodiments.

FIG. 3 illustrates an example binary search logic process 300 for implementing search logic 148 that can be used to control the gate bias voltage plus voltage adjustment setting in accordance with some embodiments. As shown, after process 300 begins at 302, the process sets a gate bias voltage ($V_G$) to 1.2 V (or any other suitable value), a voltage adjustment ($V_{ADJ}$) to 0 V (or any other suitable value), and a voltage step ($V_{STEP}$) to 64 mV (or any other suitable value) at 304. At 305, the process can turn on a calibration signal. Next, at 306, the process receives a sign bit from the 1-bit correlator 146 (FIG. 1). Then, at 308, process 300 determines if the sign bit is equal to zero. If so, the voltage adjustment ($V_{ADJ}$) is increased by the voltage step ($V_{STEP}$) and the voltage step is cut in half at 310, the output of DAC 140 is set to the gate bias voltage plus voltage adjustment setting at 312, it is determined whether the new voltage step is less than 1 mV (or any other suitable value) at 314, and, either process 300 loops back to 306 if the new voltage step is not less than 1 mV or process 300 turns off the calibration signal at 321 and terminates at 322 if it is. If it is determined at 308 that the sign bit is not equal to zero, however, then the voltage adjustment is decreased by the voltage step and the voltage step is cut in half at 316, the output of DAC 140 is set to the gate bias voltage plus voltage adjustment setting at 318, it is determined whether the new voltage step is less than 1 mV (or any other suitable value) at 320, and, either process 300 loops back to 306 if the new voltage step is not less than 1 mV or process 300 turns off the calibration signal at 321 and terminates at 322 if it is.

Figure 4:
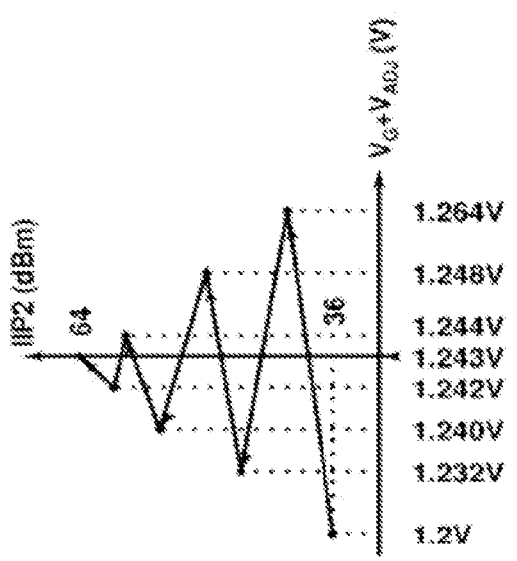
FIG. 4 is a graph of second order intercept point values that can be realized for certain calibration control settings during the process of FIG. 3 in accordance with some embodiments.

FIG. 4 shows an example of a change in the gate bias voltage plus voltage adjustment setting that can be observed during process 300, and how that setting can impact IIP2 of a circuit such as that in FIGS. 1 and 2, in accordance with some embodiments. As shown, the gate bias voltage plus voltage adjustment setting, can begin at 1.2 V. Then, the setting can increase to 1.264 V, decrease to 1.232 V, increase to 1.248 V, decrease to 1.240 V, increase to 1.244 V, decrease to 1.242 V, and finally increase to 1.243 V. After the gate bias voltage setting reaches 1.243 V and $V_{STEP}$ is halved, $V_{STEP}$ is less than 1 mV, so process 300 terminates. Through this process, the IIP2 can be increased from an initial value of 36 dBm to 64 dBm in some embodiments.

Figure 5:
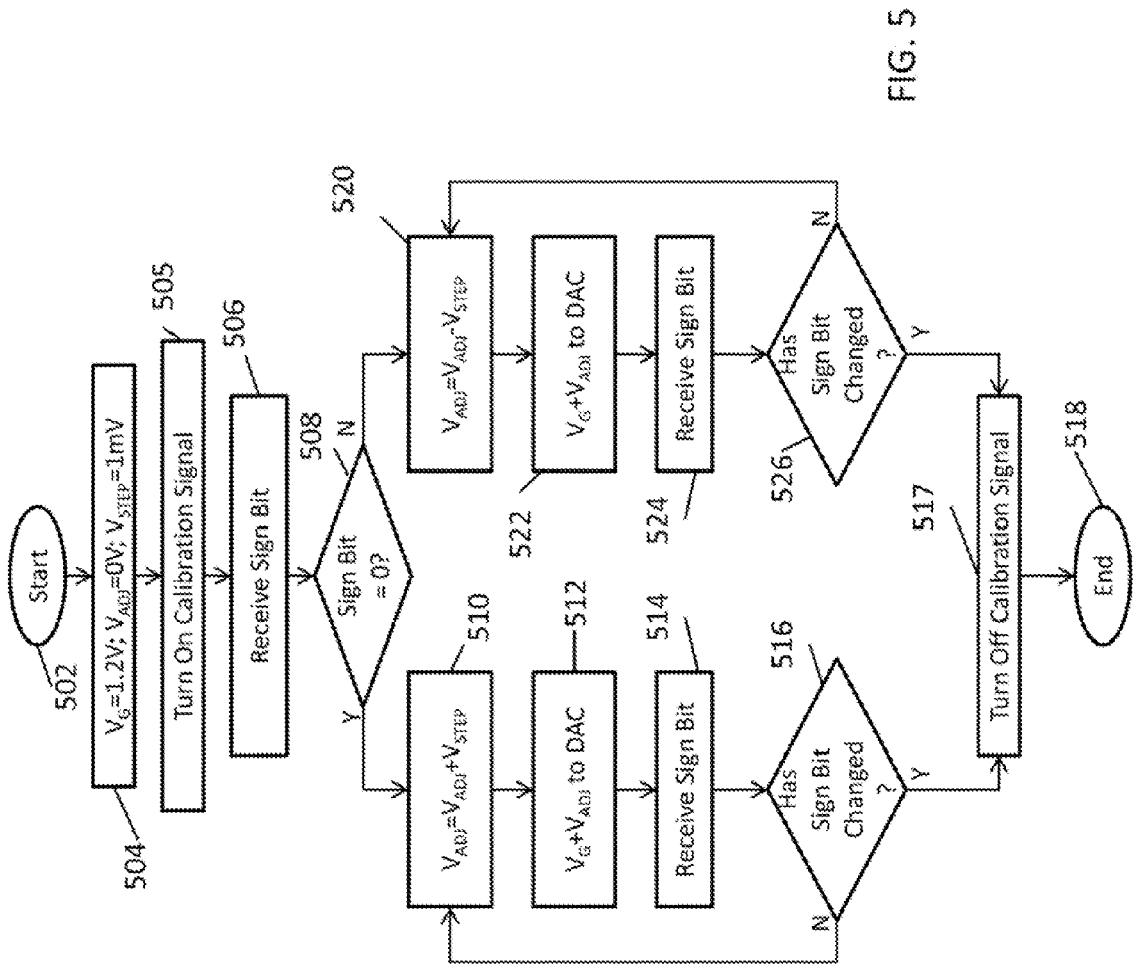
FIG. 5 is a diagram of a linear process that can be used to control calibration settings of a down-conversion mixer in a receiver in accordance with some embodiments.

Although a binary search logic is illustrated and described above in connection with FIGS. 3 and 4, any suitable search logic can be used in some embodiments. For example, linear search logic can be used in some embodiments. FIG. 5 illustrates an example linear search logic process 500 for implementing linear search logic that can be used as search logic 148 (FIG. 1) in accordance with some embodiments. As shown, after process 500 begins at 502, the process sets the gate bias, voltage ($V_G$) to 1.2 V (or any other suitable value), a voltage adjustment to 0 V (or any other suitable value), and a voltage step ($V_{STEP}$) to 1 mV (or any other suitable value) at 504. At 505, the process can turn on a calibration signal. Next, at 506, the process receives a sign bit from the 1-bit correlator. Then, at 508, process 500 determines if the sign bit is equal to zero. If so, the voltage adjustment ($V_{ADJ}$) is increased by the voltage step at 510, the output of DAC 140 is set to the gate bias voltage plus voltage adjustment setting at 512. Process 500 then receives another sign bit at 514 and determines if the sign bit has changed at 516. If the sign bit is determined to not have changed, process 500 loops back to 510. Otherwise, if the sign bit is determined to have changed, process 500 turns off the calibration signal at 517 and terminates at 518. If it is determined at 508 that the sign bit is not equal to zero, then the voltage adjustment ($V_{ADJ}$) is decreased by the voltage step at 520, the output of DAC 140 is set to the gate bias voltage plus voltage adjustment setting at 522. Process 500 then receives another sign bit at 524 and determines if the sign bit has changed at 526. If the sign bit is determined to not have changed, process 500 loops back to 520. Otherwise, if the sign bit is determined to have changed, process 500 turns off the calibration signal at 517 and terminates at 518.

Figure 6:
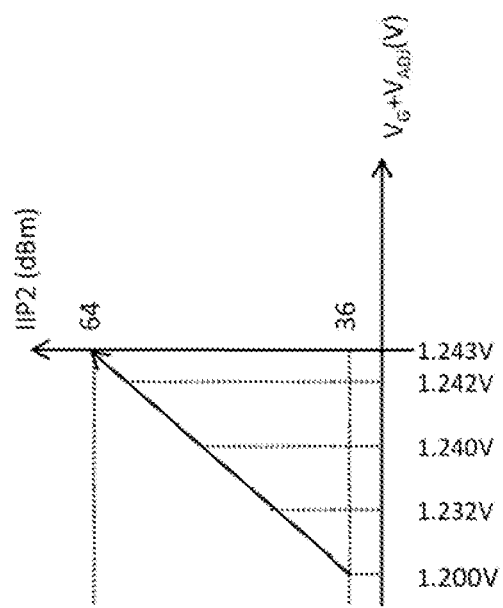
FIG. 6 is a graph of second order intercept point values that can be realized for certain calibration control settings during the process of FIG. 5 in accordance with some embodiments.

FIG. 6 shows an example of a change in the gate bias voltage plus voltage adjustment setting that can be observed during process 500, and how that setting can impact the IIP2 of a circuit such as that in FIGS. 1 and 2 when using linear search logic, in accordance with some embodiments. As shown, the gate bias voltage plus voltage adjustment setting can begin at 1.2 V (or any other suitable value). Then, the setting can increase by 1 mV steps until the sign bit changes when it reaches 1.243 V (or any other suitable value). Through this process, the IIP2 can be increased from an initial value of 36 dBm to 64 dBm in some embodiments. As illustrated in FIG. 6, process 500 would have determined at that the sign bit was equal to zero. In a case in which the sign bit were determined to not be equal to zero, then the curve in FIG. 6 would have a mirror appearance.

In some embodiments, calibration of the I-path may affect the IIP2 of the Q-path and vice versa. For example, after I-path calibration, an IIP2 of 60 dBm can be obtained for the I-path and an IIP2 of 35 dBm can be obtained for the Q-path. A subsequent Q-path calibration can improve its IIP2 to 61 dBm but degrade the I-path IIP2 to 52 dBm. However, after a total of four calibrations in some embodiments, both the I-path and the Q-path can arrive at their optimum bias conditions and the interaction between paths can become negligible.

The calibration described above can be performed online (e.g., while the receiver is receiving transmissions via antenna 102) and/or can be performed offline (e.g., while the received is prevented from receiving transmissions via antenna 102). Online operation can be facilitate by using a test tone that is out of band (e.g., 1.7 GHz) compared to a regular received signal (e.g., at 1.8 GHz).

In some embodiments, rather that using a passive mixer 126, 220, and 222, an active switching mixer can be used. Due to the DC bias current in active mixers, gate bias changes for the switching pair in the active mixers may result in output DC offset transients. Thus, in order to perform calibration, the DC offset cancellation can be allowed to settle before the calibration moves from one gate bias voltage setting to the next, which may result in significantly longer calibration times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for controlling the second order intercept point in a receiver, comprising:
   generating an amplitude modulated test tone based at least in part on a pseudo-random noise sequence;
   causing the test tone to be received by a receiver;
   applying a first gate bias voltage to a mixer in the receiver;
   producing a baseband output using the mixer in the receiver in response to the test tone and the first gate bias voltage;
   producing a first sign bit by performing a correlation on the baseband output against the pseudo-random noise sequence;
   determining whether the first sign bit is equal to zero;
   generating a first voltage adjustment based on the determination;
   generating a second gate bias voltage by combining the first gate bias voltage and the first voltage adjustment;
   applying the second gate bias voltage to the mixer;
   producing a second sign bit by performing a correlation on the baseband output against the pseudo-random noise sequence when the second gate bias voltage is applied to the mixer;
   generating a second voltage adjustment;
   generating a third gate bias voltage by combining the second gate bias voltage and the second voltage adjustment;
   applying the third gate bias voltage to the mixer;
   producing a third sign bit by performing a correlation on the baseband output against the pseudo-random noise sequence when the third gate bias voltage is applied to the mixer;
   determining whether the second sign bit and the third sign bit are different; and
   in response to determining that the second sign bit and the third sign bit are different, determining that the second-order intercept point of the receiver converges to an optimal value.

2. The method of claim 1, wherein the amplitude modulated test tone is modulated by the pseudo-random noise sequence.

3. The method of claim 1, wherein the amplitude modulated test tone is generated by combining the pseudo-random noise sequence with a local oscillator signal.

4. The method of claim 1, wherein the receiver is a direct conversion receiver.

5. The method of claim 1, further comprising downconverting the test tone.

6. The method of claim 5, further comprising filtering the downconverted test tone.

7. The method of claim 5, further comprising performing an analog to digital conversion on the downconverted test tone.

8. The method of claim 1, further comprising determining whether the second order intercept point is less than the optimal value.

9. The method of claim 1, further comprising determining whether the second order intercept point is greater than the optimal value.

10. A system for controlling the second order intercept point in a receiver, comprising:
    a test tone generator that generates an amplitude modulated test tone based at least in part on a pseudo-random noise sequence;
    a receiver that receives the test tone and produces a baseband output using a mixer in the receiver in response to the test tone and a first gate bias voltage applied to the mixer;
    a correlator that produces a first sign bit by performing a correlation on the baseband output against the pseudo-random noise sequence; and
    digital logic that:
       determines whether the first sign bit is equal to zero;
       generates a first voltage adjustment based on the determination;
       generates a second gate bias voltage by combining the first gate bias voltage and the first voltage adjustment;
       applies the second gate bias voltage to the mixer;
       produces a second sign bit by performing a correlation on the baseband output against the pseudo-random noise sequence when the second gate bias voltage is applied to the mixer;
       generates a second voltage adjustment;
       generates a third gate bias voltage by combining the second gate bias voltage and the second voltage adjustment;
       applies the third gate bias voltage to the mixer;
       produces a third sign bit by performing a correlation on the baseband output against the pseudo-random noise sequence when the third gate bias voltage is applied to the mixer;
       determines whether the second sign bit and the third sign bit are different; and
       in response to determining that the second sign bit and the third sign bit are different, determines that the second-order intercept point of the receiver converges to an optimal value.

11. The system of claim 10, wherein the test tone generator generates the amplitude modulated test tone such that it is modulated by the pseudo-random noise sequence.

12. The system of claim 10, wherein the test tone generator generates the amplitude modulated test tone by combining the pseudo-random noise sequence with a local oscillator signal.

13. The system of claim 10, wherein the receiver is a direct conversion receiver.

14. The system of claim 10, wherein the receiver downconverts the test tone.

15. The system of claim 11, wherein the receiver filters the downconverted test tone.

16. The system of claim 11, further comprising an analog to digital converter that performs an analog to digital conversion on the downconverted test tone.

17. The system of claim 11, wherein the correlator further determines whether the second order intercept point is less than the optimal value.

18. The system of claim 10, wherein the correlator further determines whether the second order intercept point is greater than the optimal value.

19. The system of claim 10, wherein the digital logic includes a digital to analog converter.

* * * * *

UNITED STATES PATENT AND TRADEMARK OFFICE
CERTIFICATE OF CORRECTION

PATENT NO. : 9,154,244 B2
APPLICATION NO. : 14/473370
DATED : October 6, 2015
INVENTOR(S) : Yiping Feng et al.

Page 1 of 1

It is certified that error appears in the above-identified patent and that said Letters Patent is hereby corrected as shown below:

Title page

Item (57) Abstract: Line 9, "point in as receiver" should be -- point in a receiver --.

Signed and Sealed this
Twenty-third Day of February, 2016

Michelle K. Lee
*Director of the United States Patent and Trademark Office*